United States Patent [19]

Bonzo

[11] Patent Number: 5,206,067
[45] Date of Patent: Apr. 27, 1993

[54] LANDFILL GAS CAPPING LINER SYSTEM

[76] Inventor: Kevin M. Bonzo, 4915 Sunnybrook Rd., Kent, Ohio 44240

[21] Appl. No.: 826,802

[22] Filed: Jan. 28, 1992

[51] Int. Cl.$^5$ ............................. B32B 3/10; B09B 1/00
[52] U.S. Cl. ............................... 428/119; 428/137;
428/138; 428/166; 428/167; 428/172; 428/198;
428/178; 428/181; 428/200; 428/212; 428/192;
428/315.5; 428/475.5; 428/116; 428/118;
210/498; 210/500.21; 405/129
[58] Field of Search ............. 428/137, 138, 166, 167,
428/172, 198, 178, 181, 200, 212, 192, 315.5,
475.5, 119, 116, 118; 405/129; 210/498, 500.21

[56] References Cited

U.S. PATENT DOCUMENTS

| | | | |
|---|---|---|---|
| 3,941,556 | 3/1976 | Pallagi | 431/202 |
| 4,076,100 | 2/1978 | Davis | 428/137 |
| 4,442,901 | 4/1984 | Zison | 166/369 |
| 4,469,176 | 9/1984 | Zison et al. | 405/129 |
| 4,518,399 | 5/1985 | Croskell et al. | 405/129 |
| 4,789,578 | 12/1988 | Twyford et al. | 428/138 |
| 4,886,696 | 12/1989 | Bainbridge | 428/138 |
| 4,946,719 | 8/1990 | Dempsey | 428/137 |
| 4,984,594 | 1/1991 | Vinegar et al. | 405/129 |
| 5,034,124 | 7/1991 | Kopf | 210/498 |

Primary Examiner—Ellis P. Robinson
Assistant Examiner—William P. Watkins, III
Attorney, Agent, or Firm—Oldham, Oldham & Wilson Co.

[57] ABSTRACT

A gas capping liner system is described which encompasses a top channeled component and a bottom perforated layer component. The top channeled component has a plurality of alternating longitudinally extending channels. The channels are of two types, (1) structural for supporting the weight of overburden clay and topsoil above the liner and (2) gas-receiving, which permit the landfill gas to be collected. The perforated layer component is positioned such that the perforations are located above the gas-receiving channels.

18 Claims, 3 Drawing Sheets

LANDFILL GAS CAPPING LINER SYSTEM

TECHNICAL FIELD

This invention relates to a landfill gas capping liner system in which the gas capturing component is contained in the polymeric liner.

BACKGROUND OF THE INVENTION

The control of the gas generated in landfills is a serious problem. Through the naturally occurring decomposition processes that occur within the waste contained in the landfill, a number of gaseous products are generated. These gaseous products are primarily methane and carbon dioxide in roughly equal quantities, and to a lesser degree nitrogen (<5%). These gaseous products, if allowed to migrate uncontrolled from a landfill, may result in dangerous conditions within buildings that the gas may enter. Uncontrolled release of the gas to the atmosphere may cause air pollution.

Landfill gas composition is controlled primarily by products of microbial reactions in the landfill. In general, a landfill will go through several different stages with different bacterial types predominating in each stage.

Solid waste initially decomposes aerobically, and the primary gas product is carbon dioxide. As the oxygen is depleted, aerobic microorganisms begin to dominate. These bacteria continue to produce carbon dioxide, but additionally, produce methane. Additional compounds are produced, and additional chemicals released into the landfill by volatilization.

The need for gas movement control is primarily to prevent the gas from damaging plants and property. Methane generated in landfills has the potential for damaging vegetation, as it displaces oxygen from the root zone.

The mechanics of gas movement through refuse and soil are extremely complicated. The gas will tend to migrate from the landfill on a path that offers the least resistance. Gas will migrate further through a sand and gravel soil than through a silt or clay soil. The rate of migration is strongly influenced by weather conditions. As the barometric pressure falls, gas will tend to be forced out of the landfill into the surrounding formations. As the pressure rises, gas may be retained within the landfill for a short time period as new pressure balances are established.

Controlling gas movement at a landfill begins with a study of the local soils, geology and nearby area. Typically, landfills are covered by a combination capping system. This system can include a series of bentonite clays and a polymeric (typically polyvinyl chloride (PVC)) liner. This liner system has the dual purpose of excluding moisture infiltration into the landfill, allows for proper management of surface water by directing infiltrated water to sedimentation/stormwater retention basins and to contain landfill gas and odors. The latter effect of polymeric liners requires that gas which collects under the liner be directed to vents so as to minimize lateral migration of the gas, into potentially occupied structures.

Passive vents and active gas pumping systems are used to control landfill gas migration. Passive systems rely on natural pressure and convection mechanisms to vent the landfill gas to the atmosphere. Shallow gas venting trenches, or gas venting pipes, installed within the landfill and vented to the atmosphere, have been used to allow gas from interior regions of the landfill to escape. These natural vents may be equipped with flares to burn off the gas in order to prevent odor problems.

Passive vents however suffer from a number of defects. In general, they are not very effective in removing the landfill gas from under the cover, resulting in vegetative stress. This failure is generally attributed to the fact that there is insufficient pressure on the gas within the landfill to push it to the venting device. An additional problem with the passive design lies in that alternating periods of high and low barometric pressure result in atmospheric air entering the landfill when barometric pressure rises.

Active gas collection systems remove the landfill gas under a vacuum from the landfill or surrounding soil formation, with the gas being pumped out of the ground. A pipe network is built to interconnect the wells and blower equipment. Recovery wells are constructed near the perimeter of the landfill. Depending on site conditions, the wells may be placed in the waste or in the soil formation immediately adjacent to the landfill. The location will depend on site access, the type of soil formation around the site, and the type of waste in the landfill.

Borehole diameters are generally two to three feet. Larger diameter holes provide more surface area at the refuse-gravel interface and require less suction for gas removal. This configuration is above ground, therefore providing easy access to piping. An alternative design is for the interconnection between the well and header pipe to be entirely below ground, and is best suited for installation at landfills where all equipment must be out of sight.

Well depths ranging from 50-90% of the refuse thickness are common, except where groundwater conditions are encountered, and then the well is terminated at the water table. The well casing is usually some type of slotted plastic pipe. It is important that the wells be individually valved so the vacuum applied to each well can be regulated. Gas probes are used to monitor the performance of the control wells.

Wells are connected to a collection system that carries the gas to a collection point. Collected landfill gas can be directly vented to the atmosphere, burned, or directed to an energy recovery system.

SUMMARY OF THE INVENTION

It is an object of this invention to provide a gas capping collection system which eliminates the need for trenches dug into the landfill.

It is a second object of this invention to provide a gas capping collection system which eliminates the need for gas permeable pipes within the trenches in the landfill.

It is a third object of this invention to provide a gas capping collection system wherein the gas collection system is an integral component of the polymeric cover liner which is placed on top of the landfill.

It is a fourth object of this invention to provide a gas capping collection system which is compatible with existing methods of landfill control and maintenance.

It is a fifth object of this invention to provide a gas capping collection system which minimizes atmospheric air from entering the landfill, thereby allowing anaerobic decomposition to be the primary mode of decomposition, thereby minimizing the risk of landfill fire as may occur where active extraction systems draw surface air into the landfill.

It is a sixth object of this invention to provide a gas capping system which provides for both emission and odor control.

These and other objects of this invention will be evident when viewed in light of the drawings, detailed description, and appended claims.

DETAILED DESCRIPTION OF THE DRAWINGS

| DETAILED COMPONENT PART LIST | |
|---|---|
| Part Number | Description |
| 2 | landfill-contacting bottom side |
| 4 | top side of the liner |
| 6 | exterior edges |
| 8 | first gas permeable region |
| 8' | second gas permeable region |
| 10 | gas permeable apertures |
| 12 | structural longitudinal channels |
| 14 | gas receiving longitudinal channels |
| 16 | channel wall |
| 18 | non-perforated segment |
| 20 | interior side of the perforated layer sheet |
| 22 | thickness of the perforated layer sheet |
| 24 | perforated-layer-contacting side |
| 80 | multi-channeled component |
| 90 | perforated layer sheet |
| 100 | gas capping liner system |
| h | channel wall height |

DETAILED DESCRIPTION OF THE INVENTION

Figure 1:
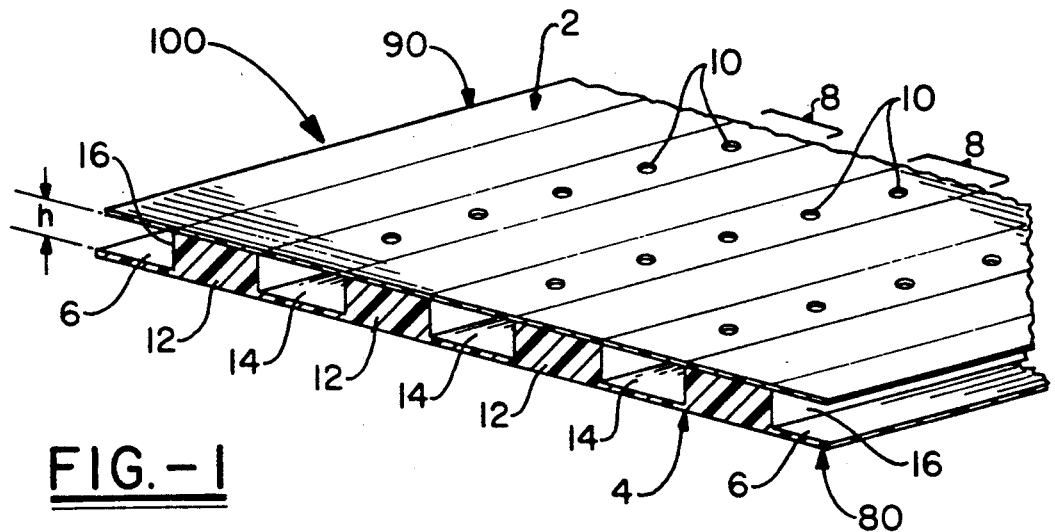
FIG. 1 is a perspective view of the landfill gas capping liner with a plurality of gas-permeable regions forming a first embodiment of the invention.

The gas capping liner system 100, as shown in perspective in FIG. 1, is a multicomponent system. As better illustrated in FIG. 2, this system includes; (1) a multi-channeled component 80; and (2) a perforated layer sheet 90, the combination thereof comprises the gas capping liner system 100.

As viewed in FIGS. 1-6, the gas capping liner system 100 is shown inverted. In actual application, the liner would be positioned with landfill-contacting bottom side 2 of perforated layer sheet 90 contacting the top of the landfill or geotextile and multi-channeled component 80 on top of the perforated layer sheet. In a typical landfill capping operation, a thick layer of overburden of clay and soil would be positioned over the top side of the liner 4 of the multi-channeled component 80 of the liner system 100. Since the surface of a landfill is typically not a smooth, liner system 100 is generally flexible. This permits the liner to be applied over irregular surfaces without any cracking or breaking of the liner system. To achieve this end, polymeric liners are typically preferred.

In general, and addressed more specifically later in the application, the components of the liner system require different polymeric characteristics. Since one of the functions of multi-channeled component 80 is for structural integrity and to permit the channels within to remain open even though up to several feet of overburden may be placed above the liner, the polymer of choice will tend to emphasize strength characteristics over flexibility characteristics. On the other hand, perforated layer sheet 90 is not involved primarily with the structure of the liner 100, but rather its function will tend to maximize flexibility thereby permitting the liner to be placed on highly irregular and even sharp jagged material without cutting or tearing. The thickness of perforated layer sheet 90 will be dependent upon the irregularity of the surface of the landfill and the polymer used in the sheet construction. In general, the thickness will range from 1-100 mils.

Perforated layer sheet 90 is typically an elastomeric polymer. While not wishing to be limited to the enumerated polymers, examples of such would be polyvinyl chloride (PVC), polyethylene (PE), polypropylene (PP), polybutylene (PB), polyethylene terephthalate (PET), polybutylene terephthalate (PBT), polyimide, such as a nylon (e.g., nylon-6,6, nylon-4,6, nylon-6,12, etc.) or modified polymers thereof, or copolymers thereof. The exact nature of the polymer is critical only in the sense that it should be manufactured inexpensively, possess inherent flexibility, and be capable of being extruded in sheet form. It is envisioned that it is possible to use a very low density polyethylene for this component of the invention. The lower density polyethylenes have superior flexibility, softness, and puncture resistance. These are highly desirable features in any gas capping liner system in that it is this side which will be in contact with the landfill surface which is highly irregular in shape.

Perforated layer component 90 contains a plurality of gas-permeable regions 8. In one embodiment of this invention, these gas-permeable regions 8 are apertures or holes 10 which are cut into the polymeric sheet subsequent to the extrusion process. The exact size of the holes 10 will be dependent upon several factors: (1) the nature of the refuse contained in the landfill; (2) the amount of landfill gas which is anticipated to be generated during the decomposition process; and (3) the amount of suction which is to be applied to the liner system. It is envisioned that each gas-permeable aperture 10, rather than being a single hole, could also be a plurality of smaller apertures within a region. In a second embodiment of this invention, it is equally envisioned that the gas-permeable regions could be a membrane 8 or a combination of membranes 8' as seen in FIG. 5.

Figure 5:
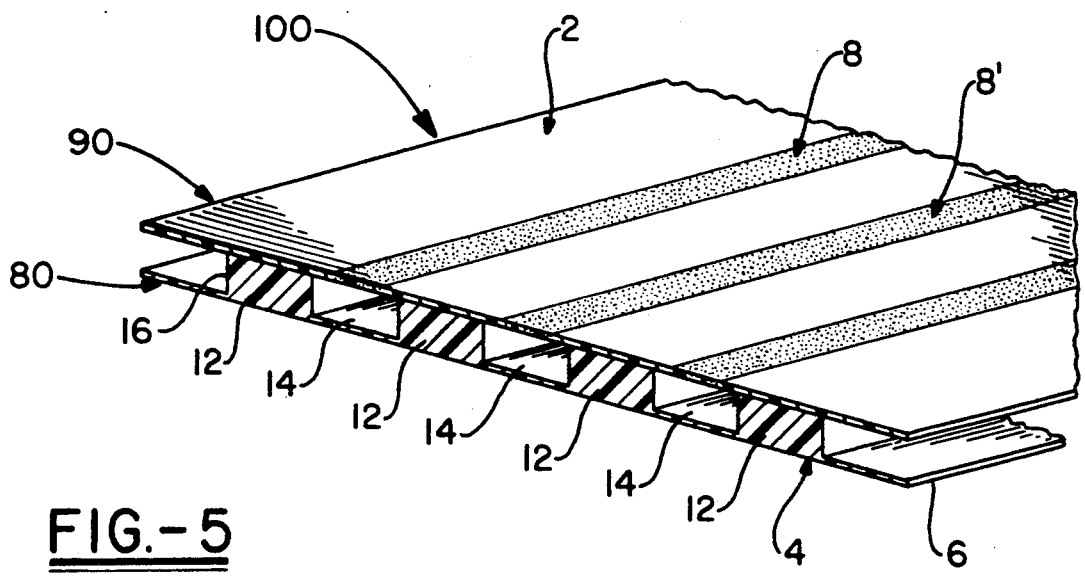
FIG. 5 is a perspective view of the landfill gas capping liner with a longitudinal membrane(s) as the gas-permeable regions forming a second embodiment of the invention.
Figure 6:
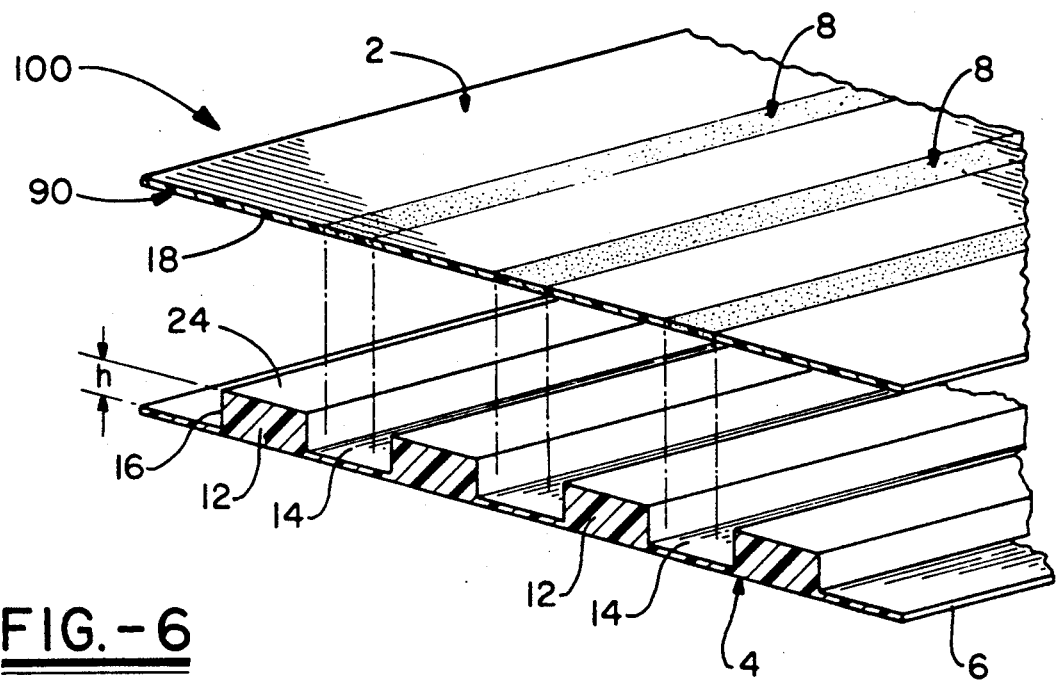
FIG. 6 is an exploded perspective view of the landfill gas capping liner with membrane(s) illustrating the two components which in combination form the liner of FIG. 5.

When the liner incorporates a membrane FIGS. 5-6, it is possible to optimize the composition of the final collected gas. When used in this mode, it is possible to utilize different membranes for the gas-permeable regions 8 and 8'. In this embodiment, gas permeable membrane 8 could either be the same or different from gas permeable membrane 8'. For example, gas permeable membrane 8 could be preferentially selective to methane (CH4) over carbon dioxide (CO2). This means that the ratio of $CH_4/CO_2$ will be high. Similarly, gas permeable membrane 8' could be preferentially selective to carbon dioxide over methane, with the $CO_2/CH_4$ ratio also being maximized. In landfills where a significant amount of gas condensate is generated, a membrane which is impervious to water could also be incorporated into the membrane. In a typical operation, condensate is collected and managed as a wastewater, which is a potentially hazardous waste.

In operation, when gas permeable regions 8,8' are two different membranes, it is possible for the landfill operator to selectively collect landfill gas of fairly uniform composition. This would be achieved by selectively choosing the gas receiving channels of either gas permeable region 8 or gas permeable region 8', by simply closing off the collection valves (not shown) at the collection end of the system which are attached to the non-desired gas receiving channel. In this fashion, the landfill operator can tune the collected gas to any desired composition of $CO_2$ and $CH_4$ which a potential customer may desire thereby maximizing the selling price of what otherwise would be a wasted gaseous product.

When the nature of the landfill is such that it contains a high degree of very finely divided particulate matter, then the size of the holes will need to be fairly small to prohibit the flow of the particulates into the liner system. This of course, is not an issue when the gas permeable regions are membranes or when the gas permeable regions are positioned on top of a geotextile, which functions to preclude drawing particulate matter into the system.

The second component of the gas capping liner system is multi-channeled component 80. As with the perforated layer sheet 90, the multi-channeled component will preferably be constructed from a polymer. In a preferred embodiment, the polymer used will be compatible with that used in the perforated layer. The structural considerations for the multi-channeled component are somewhat different however from that of the perforated layer. The multi-channeled component must possess sufficient structural integrity to not collapse under the weight of several feet of soil overburden which is typically placed over the liner system. This multi-channeled component requires good dimensional stability. A higher density polyethylene is a preferred component for the necessary stiffness and strength.

Figure 7:
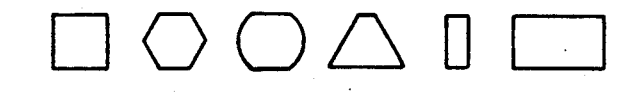
FIG. 7 is a cross-sectional side view of the possible geometric shapes envisioned for use as structural longitudinal channels.

The multi-channeled shape of this component is obtained by employing a suitable ribbed die profile. Through continuously extruding the multi-channeled component, a plurality of longitudinally drawn channels, parallel to the machine direction will be generated. While a generally rectangular shape is shown in FIGS. 1-4, it is envisioned that other geometric n-sided closed polygon shapes are also suitable as shown in FIG. 7. It is seen that as the value of "n" increases to a fairly large number, the polygon approaches a circle in shape. The thickness (h) of multi-channeled component sides 16 can range from 0.1–1" and is dependent upon the factors of the gas permeable region flow rate, landfill gas generation rate, size of the gas capping system, etc.

Figure 2:
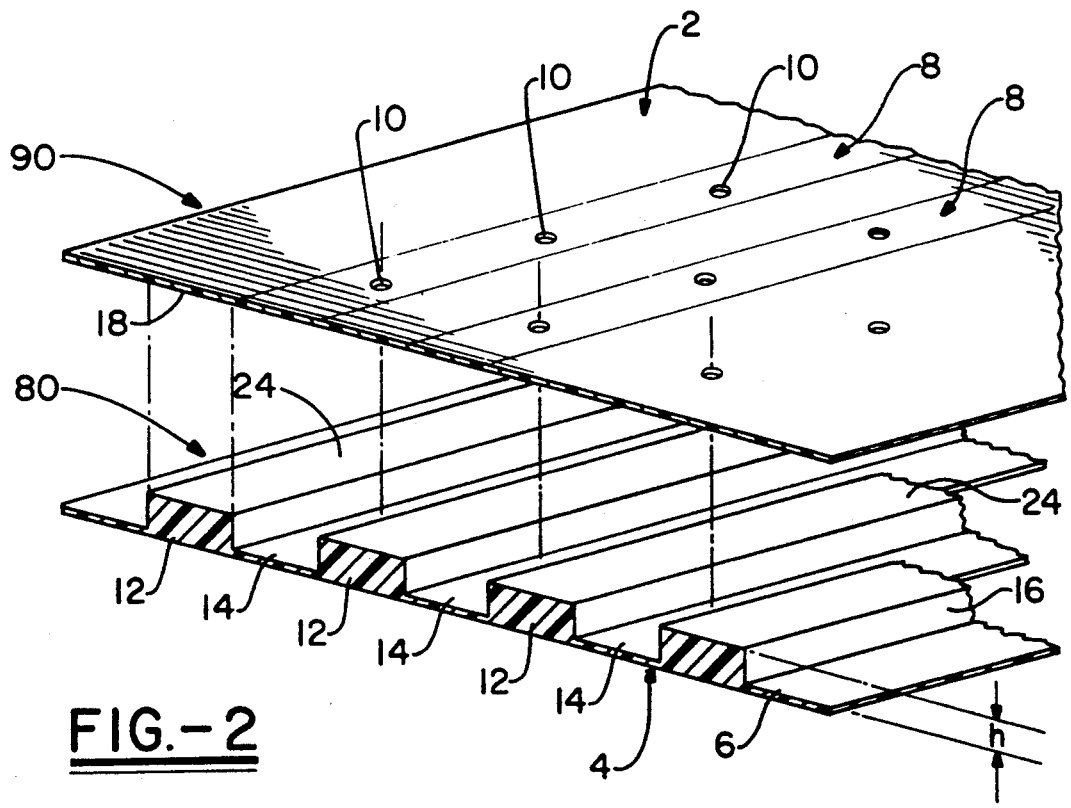
FIG. 2 is an exploded perspective view of the landfill gas capping liner illustrating the two components which in combination form the liner.
Figure 3:
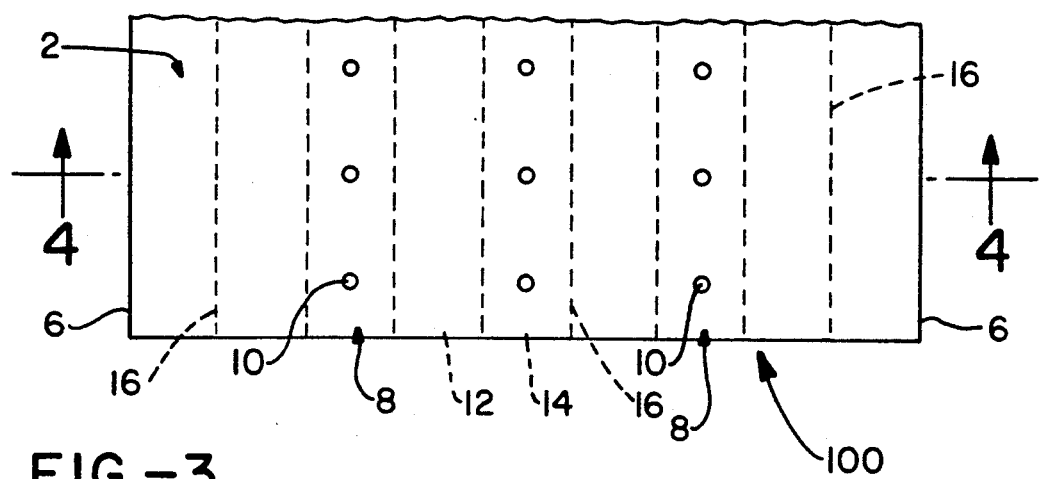
FIG. 3 is a bottom plan view of the gas capping liner.
Figure 4:
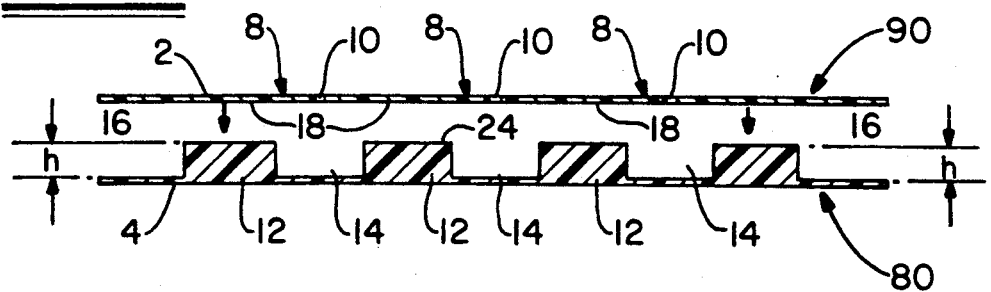
FIG. 4 is an exploded side elevational view of the gas capping liner taken along the line 4—4 of FIG. 3 illustrating the two components which in combination form the liner.

As illustrated in perspective in FIG. 2 and shown in two-dimensions in FIGS. 3–4, multi-channeled component 80 contains a plurality of discrete essentially parallel channels which run longitudinally along the length of landfill gas capping liner system 100. Specifically, the discrete channels are of two types; (1) structural channels 12 and (2) gas-receiving channels 14. It is recognized that the gas-receiving channels 14 are essentially voids created between the structural channels 12, which are essentially solid.

While the gas capping liner system shown utilizes a plurality of structural channels and receiving channels, it can be seen that for the liner system to function as intended, only two structural channels and one receiving channel are necessary.

Actual fabrication of gas capping liner system 100 requires the bonding of perforated layer 90 to multi-channeled component such that either the gas permeable regions 8 and 8, or the gas permeable apertures 10 are aligned immediately above gas-receiving channels 14. This is accomplished by adhering non-perforated regions 18 to perforated-layer-contacting side 24 of the multi-channeled component. By this alignment, landfill gas, which is at some positive pressure, i.e., pressure above ambient, will naturally migrate vertically toward the surface of the landfill due to the differential pressure between the interior of the landfill and the atmosphere, and enter gas permeable regions 8 and 8' or gas permeable apertures 10 for subsequent removal to a collection station (not shown). This transport of the landfill gases to the collection station is typically assisted through an induced negative pressure on the collection zones.

The actual attachment of perforated layer 90 to multi-channeled component 80 can be accomplished in several different ways. Since both components are polymeric in nature, it is possible to heat-seal the two components together. Alternatively, the two components may be attached by a suitable adhesive which is capable of bonding the two materials together. Such adhesive may be a pressure-sensitive adhesive.

Gas capping liner system 100 is of a dimension of between three to fifty feet in width, and of any desired length. In a preferred embodiment, this liner system comes in easy to apply rolls. In order to keep the liner system to a reasonable weight, the width of the roll is typically six to twenty feet in width. Since any landfill is greater than the width of any one roll, the product is seamed along the edges 6. Seaming of landfill liners is known in the art, and typically involves a heat sealing tool.

DISCUSSION

The primary benefit of this gas-capping liner system lies in its ability to collect landfill gas from the entire surface area of the landfill. Alternative gas removal systems typically require extensive piping systems which are excavated into the landfill prior to the capping operation. These generally tubular gas collecting pipes generally extend from the surface downwardly through the various soil and landfill layers. The collecting pipes usually have a plurality of longitudinally extending slots or circular apertures through which the gas may enter. The lower end of the pipe is closed. In addition to this vertical piping system, a series of horizontal pipes may be employed in an effort to control the entire area. It of course is recognized, that both vertical or horizontal piping, whether used passively or actively, have limited zones (spheres) of influence.

As is easily seen, this type of gas control and collection means is heavily dependent upon the location and positioning of the initial gas collection pipes. Especially in regard to the horizontal collection pipes, the depth to which the collection pipe is positioned is critical in that it must remain above any water table.

By using the gas cap collection system of the instant invention, it can be seen that the concerns which permeate the traditional piping systems are alleviated. Gas can be collected from any surface area of the landfill thereby eliminating the need for costly and time-consuming excavations, pipe installations and fitting operations. These purposes are accomplished by simply lining the top of the landfill followed by subsequent overburden positioning with clay and topsoil.

While in accordance with the patent statutes, a best mode and preferred embodiment have been described in detail, the invention is not limited thereto, rather the invention is measured by the scope of the attached claims.

What is claimed is:

1. A flexible landfill gas capping polymeric liner capable of collecting a landfill gas from the entire surface area of a landfill which comprises:
   (a) a top channeled member having at least two parallel spaced longitudinal structural channels disposed within the channeled member and at least one gas receiving longitudinal channel for collecting the landfill gas, adjacent to and coextending with the structural channels;
   (b) a bottom sheet layer having a plurality of gas-permeable regions attached to a substantial portion of the channeled member such that the gas-permeable regions are positioned at an open end of the gas-receiving channel; and
   (c) an induced negative pressure means for transporting the collected landfill gas to a collection station.

2. The liner of claim 1 wherein the longitudinal structural channels are essentially rectangular.

3. The liner of claim 1 wherein the longitudinal structural channels are essentially closed polygons, which have at least a side which can act as an attachment point to the bottom layer.

4. The liner of claim 1 wherein the channeled member is secured to the sheet layer at a perforated-layer-contacting side of the structural channel by an adhesive.

5. The liner of claim 4 wherein the adhesive is a pressure-sensitive adhesive.

6. The liner of claim 1 wherein the channeled member is secured to the sheet layer at a perforated-layer-contacting side of the structural channel by a heat seal.

7. The liner of claim 1 wherein the gas-permeable region is a hole.

8. The liner of claim 1 wherein the gas-permeable region is a series of minute apertures within the gas-permeable region.

9. The liner of claim 1 wherein the gas-permeable region is a membrane.

10. The liner of claim 9 wherein the membrane is an essentially longitudinally-extending membrane positioned at the open end of the gas-receiving channel.

11. The liner of claim 10 wherein the gas-permeable region is comprised of a first and a second membrane, each membrane positioned above a gas-receiving channel, the first membrane selectively permeable to methane and the second membrane selectively permeable to carbon dioxide.

12. The liner of claim i wherein the channeled member has an outwardly extending flap along its longitudinal axis for sealing an additional liner at each flap.

13. The liner of claim 1 wherein the liner is a polymer.

14. The liner of claim 13 wherein the polymer is selected from the group consisting of polyvinyl chloride, polyethylene, polypropylene, polybutylene, polyethylene terephthalate, polybutylene terephthalate, and polyamides.

15. The liner of claim 14 wherein the polyamide is selected from the group consisting of nylon-6,6, nylon-4,6, and nylon-6,12.

16. The liner of claim 13 wherein the polymer is a copolymer.

17. The liner of claim 13 wherein the polymer is a modified polymer.

18. The liner of claim 16 wherein the copolymer is a modified copolymer.

* * * * *